(12) United States Patent
Schalles et al.

(10) Patent No.: US 10,895,379 B2
(45) Date of Patent: Jan. 19, 2021

(54) DUAL MODE REGENERATIVE BURNER SYSTEM AND A METHOD OF HEATING A FURNACE USING A DUAL MODE REGENERATIVE BURNER SYSTEM

(71) Applicant: Bloom Engineering Company Inc., Pittsburgh, PA (US)

(72) Inventors: David G. Schalles, Jefferson Hills, PA (US); Frank L. Beichner, West Newton, PA (US)

(73) Assignee: Bloom Engineering Company, Inc., Pittsburgh, PA (US)

( * ) Notice: Subject to any disclaimer, the term of this patent is extended or adjusted under 35 U.S.C. 154(b) by 239 days.

(21) Appl. No.: 15/892,700

(22) Filed: Feb. 9, 2018

(65) Prior Publication Data

US 2018/0231242 A1 Aug. 16, 2018

Related U.S. Application Data

(60) Provisional application No. 62/458,253, filed on Feb. 13, 2017.

(51) Int. Cl.
*F23C 1/00* (2006.01)
*F23C 9/00* (2006.01)
(Continued)

(52) U.S. Cl.
CPC .................. *F23C 1/00* (2013.01); *F23C 1/08* (2013.01); *F23C 6/02* (2013.01); *F23C 7/06* (2013.01);
(Continued)

(58) Field of Classification Search
CPC .............. F23L 15/02; F23L 15/04; F23C 1/08
(Continued)

(56) References Cited

U.S. PATENT DOCUMENTS 4,604,051 A 8/1986 Davies et al.
4,923,391 A 5/1990 Gitman
(Continued)

FOREIGN PATENT DOCUMENTS

EP 2333412 A1 6/2011
JP 09111334 A 4/1997
(Continued)

OTHER PUBLICATIONS

Younessi-Sinaki, et al., "Kinetic model of homogeneous thermal decomposition of methane and ethane", International Journal of Hydrogen Energy, 2009, vol. 34, pp. 3710-3716.

*Primary Examiner* — Steven B McAllister
*Assistant Examiner* — Aaron H Heyamoto
(74) *Attorney, Agent, or Firm* — The Webb Law Firm (57) ABSTRACT

A method and apparatus for heating a furnace using a burner system having first and second burner assemblies, each including a burner and a regenerative media bed, the method including operating the first burner assembly in a firing mode and the second burner assembly in a regeneration mode, switching the first burner assembly from the firing mode to the regeneration mode and the second burner assembly from the regeneration mode to the firing mode, and operating the second burner assembly in the firing mode and the first burner assembly in the regeneration mode. The burner assembly in the firing mode may be fired in either a first operating mode where the burner is supplied with preheated low calorific fuel and the burner is supplied with oxidizing gas or a second operating mode where the burner is supplied with preheated oxidizing gas and the burner is supplied with high calorific fuel.

11 Claims, 6 Drawing Sheets

(51) Int. Cl.
- *F23C 6/02* (2006.01)
- *F23C 10/22* (2006.01)
- *F23L 15/04* (2006.01)
- *F23C 10/00* (2006.01)
- *F23C 7/06* (2006.01)
- *F23D 14/66* (2006.01)
- *F23L 15/02* (2006.01)
- *F23C 1/08* (2006.01)

(52) U.S. Cl.
CPC .............. *F23C 9/00* (2013.01); *F23C 10/005* (2013.01); *F23C 10/22* (2013.01); *F23D 14/66* (2013.01); *F23L 15/02* (2013.01); *F23L 15/04* (2013.01); *F23D 2204/10* (2013.01); *Y02E 20/34* (2013.01)

(58) Field of Classification Search
USPC .......................................................... 431/11
See application file for complete search history.

(56) References Cited

U.S. PATENT DOCUMENTS

| | | | |
|---|---|---|---|
| 4,943,231 A | | 7/1990 | Jenkins et al. |
| 5,180,300 A | * | 1/1993 | Hovis ................... F23C 6/045 431/115 |
| 6,036,486 A | | 3/2000 | Argent et al. |
| 6,644,962 B2 | | 11/2003 | Sugimoto et al. |
| 8,690,566 B2 | | 4/2014 | Zucchelli |
| 2010/0047727 A1 | | 2/2010 | Chever et al. |
| 2010/0143854 A1 | * | 6/2010 | Mikuriya ............... F23D 14/66 431/161 |
| 2012/0328999 A1 | * | 12/2012 | Braud ..................... F23C 5/28 432/2 |
| 2016/0003543 A1 | | 1/2016 | Simpson et al. |
| 2016/0245514 A1 | | 8/2016 | Ageno et al. |

FOREIGN PATENT DOCUMENTS

| | | | |
|---|---|---|---|
| JP | 2005055036 A | * | 3/2005 |
| JP | 2005055036 A | | 3/2005 |
| KR | 20140026699 A | | 3/2014 |
| KR | 101407320 B1 | * | 6/2014 |

* cited by examiner

DUAL MODE REGENERATIVE BURNER SYSTEM AND A METHOD OF HEATING A FURNACE USING A DUAL MODE REGENERATIVE BURNER SYSTEM

CROSS REFERENCE TO RELATED APPLICATIONS

The present application claims priority to U.S. Provisional Patent Application No. 62/458,253, filed Feb. 13, 2017 entitled "Dual Mode Regenerative Burner System and a Method of Heating a Furnace Using a Dual Mode Regenerative Burner System", the disclosure of which is hereby incorporated in its entirety by reference.

BACKGROUND OF THE INVENTION

Field of the Invention

This invention relates to a system for and a method of heating a furnace using a dual mode regenerative burner system, and more specifically, a method of heating a furnace wherein the fuel may be changed from a low calorific fuel to a high calorific fuel and a regenerative media bed within the burners used to heat the furnace may be used to heat either the low calorific fuel or combustion air.

Description of Related Art

Prior art regenerative burner systems utilize two burner assemblies, each having a burner and one or two regenerative media beds.

In regenerative burner systems having a single regenerative bed for each burner assembly, either the fuel or the oxidizing gas can be preheated. When the oxidizing gas is preheated, it is necessary to utilize high calorific fuel in order to achieve high efficiency of the burner. When the fuel is preheated, it is necessary to utilize low calorific fuel as high calorific fuel will clog the regenerative media bed.

Regenerative burner systems having two regenerative beds for each burner assembly are specifically designed for use with low calorific fuels in order to increase the efficiency of the burner.

Therefore, there is a need for a regenerative burner system capable of efficiently switching between high calorific fuel and low calorific fuel while also providing means to preheat the fuel or the oxidizing gas as needed depending on the fuel that is used and a reduction in the size of the regenerative burner system as compared to the prior art systems having a total of four regenerative media beds so that the regenerative burner system occupies less space upon installation.

SUMMARY OF THE INVENTION

The present invention is directed to a method of heating a furnace using a regenerative burner system, wherein the regenerative burner system comprises a first burner assembly and a second burner assembly, each burner assembly comprising a burner and a regenerative media bed. The first burner assembly is operated in a firing mode and the second burner assembly is operated in a regeneration mode for a first period of time. The operation of the first burner assembly is switched from the firing mode to the regeneration mode, and the operation of the second burner assembly is switched from the regeneration mode to the firing mode. The second burner assembly is operated in the firing mode, and the first burner assembly is operated in the regeneration mode for a second period of time. The burner assembly in the firing mode may be fired in either a first operating mode or a second operating mode. The first operating mode comprises supplying the burner with low calorific fuel that has been preheated in the regenerative media bed and supplying the burner directly with oxidizing gas, and the second operating mode comprises supplying the burner with oxidizing gas that has been preheated in the regenerative media bed and supplying the burner directly with high calorific fuel. The burner assembly in the regeneration mode may function as a flue such that the regenerative media bed is heated by products of combustion exhaust flowing from the first burner assembly.

The high calorific fuel may be a hydrocarbon-bearing fuel subject to thermal decomposition reactions that generate free carbon and may be a gaseous fuel having a heating value of 150 to 3000 BTU/scf or an oil having a heating value of 10,000 to 20,000 BTU/pound, for example, natural gas, coke gas, oil, and mixed coke/blast furnace gas.

The low calorific fuel may have a heating value of 75-100 BTU/scf, for example, an off gas from a blast furnace or a similar process.

In the first operating mode, the oxidizing gas may be preheated prior to being supplied to the burner and/or supplemental high calorific fuel may be supplied to the burner.

In the second operating mode, the high calorific fuel may be preheated prior to being supplied to the burner and/or supplemental oxidizing gas that has not passed through the regenerative media bed is supplied to the burner for nozzle cooling.

The present invention is also directed to a regenerative burner system for a furnace comprising a first burner assembly and a second burner assembly each comprising a burner and a regenerative media bed, an oxidizing gas supply, a low calorific fuel supply, a high calorific fuel supply, an inlet for exhaust gases from the furnace, and an outlet for exhaust gases that have passed through the regenerative media bed. The regenerative bed of each burner assembly can be supplied with oxidizing gas or low calorific fuel, and the burner of each burner assembly can be directly supplied with oxidizing gas and/or a high calorific fuel.

Each of the burner assemblies can be operated in a firing mode where fuel and oxidizing gas flow into the burner assembly and in a regeneration mode where combustion gases from the furnace flow into the burner assembly and through the regeneration bed. When the first burner assembly is in the firing mode, the second burner assembly is in the regeneration mode, and when the first burner assembly is in the regeneration mode, the second burner assembly is in the firing mode. The burner assembly in the firing mode may be operated in a first operating mode in which fuel is supplied to the regenerative bed and oxidizing gas is supplied to the burner or in a second operating mode in which oxidizing gas is supplied to the regenerative bed and fuel is supplied to the burner. In the first operating mode, the fuel is supplied from the low calorific fuel supply and, in the second operating mode, the fuel is supplied by the high calorific fuel supply.

The regenerative burner system may further comprise a preheater for the oxidizing gas supply such that, in the first operating mode, the oxidizing gas is preheated prior to being supplied to the burner and/or a preheater for the high calorific fuel supply, such that, in the second operating mode, the high calorific fuel is preheated prior to being supplied to the burner.

In the first operating mode, supplemental high calorific fuel may be supplied to the burner, and in the second operating mode, supplemental oxidizing gas that has not passed through the regenerative media bed may be supplied to the burner for nozzle cooling.

DESCRIPTION OF THE INVENTION

It is to be understood that the invention described herein may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting. As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. For example, a range of "1 to 10" is intended to include any and all sub-ranges between and including the recited minimum value of 1 and the recited maximum value of 10, that is, all subranges beginning with a minimum value equal to or greater than 1 and ending with a maximum value equal to or less than 10, and all subranges in between, e.g., 1 to 6.3, or 5.5 to 10, or 2.7 to 6.1. Plural encompasses singular and vice versa. When ranges are given, any endpoints of those ranges and/or numbers within those ranges can be combined with the scope of the present invention. "Including", "such as", "for example" and like terms means "including/such as/for example but not limited to".

The present invention is directed to a method of heating a furnace, for example, a reheat furnace, using a regenerative burner system that may be operated in two modes, one using a high calorific fuel and one using a low calorific fuel.

A regenerative combustion burner system comprising a first burner 10A coupled to a first regenerative media bed 12A and a second burner 10B coupled to a second regenerative media bed 12B is provided. Each burner 10A, 10B is cycled between a firing mode and a regeneration mode. When the first burner 10A is firing, the second burner 10B functions as a flue, and the second regenerative media bed 12B collects heat from the products of combustion exhaust (arrow E) flowing from the first burner 10A. After the regenerative media in the second regenerative media bed 12B has been heated by the exhaust flowing from the first burner 10A, the burners 10A, 10B are cycled such that the second burner 10B is placed in the firing mode, the first burner 10A functions as a flue, and the first regenerative media bed 12A collects heat from the products of combustion exhaust (arrow E) flowing from the second burner 10B. At the same time, one of the necessary gases for combustion, fuel or combustion air, passes through the heated second regenerative media bed 12B where the gas is preheated before entering the second burner 10B. When the collected heat in the second regenerative media bed 12B has been depleted and the first regenerative media bed 12A has been sufficiently heated, the burners 10A, 10B are cycled again such that the first burner 10A is placed in the firing mode, the second burner 10B functions as a flue, and the second regenerative media bed 12B collects heat from products of combustion exhaust (arrow E) flowing from the first burner 10A. At this time, one of the necessary gases for combustion, fuel or combustion air, passes through the heated first regenerative media bed 12A where the gas is preheated before entering the first burner 10A. The burners 10A, 10B continue to be cycled in this manner while heating the furnace.

The fuel supplied to the burners 10A, 10B may be high calorific fuel or may be low calorific fuel. High calorific fuels are hydrocarbon-bearing fuels that are subject to thermal decomposition reactions which generate free carbon. The decomposition of these high calorific fuels having high concentrations of methane and/or higher order hydrocarbons may begin at temperatures as low as 932° F. (Younessi-Sinaki et al., "Kinetic model of homogeneous thermal decomposition of methane and ethane", International Journal of Hydrogen Energy, Vol. 34, pp. 3710-3716, 2009). Since the free carbon created during decomposition tends to clog regenerative media beds, these high calorific fuels are not suitable for regenerative heating. Heating values of such industrial high calorific fuels would typically be 150 to 3000 BTU/scf for gaseous fuels and 10,000 to 20,000 BTU/pound for oils. Constituents of high calorific fuels include hydrocarbon compounds in the range of about 5-100%, with hydrogen and carbon monoxide representing possible additional combustible compounds, and the balance inert gases, such as carbon dioxide, nitrogen, and water vapor. Such high calorific fuels include natural gas, coke gas, oil, or mixed coke/blast furnace gas.

Low calorific fuels have typical heating values of 75-140 BTU/scf, for example, 45-100 BTU/scf. Primary constituents of low calorific fuels include hydrogen, carbon monoxide, carbon dioxide, and nitrogen, and water vapor. Low calorific fuels may also include hydrocarbons, for example, methane, and oxygen in trace amounts (less than about 3%). Such low calorific fuels may include off gas from a blast furnace or similar process and producer gas produced by carburetting air or other gases without pyrolysis through processes such as fixed-bed gasification of lump fuel, gasification of granular or pulverulent fuels in suspension, gasification using molten salts or metals, carburetting by pyrolysis of carbonaceous material in a fuel bed and carburetting by pyrolysis of carbonaceous material in a carburetor.

In order to increase the efficiency of the burners 10A, 10B when using low calorific fuel, the fuel can be preheated prior to entering the burners 10A, 10B. In order to increase the efficiency of the burners 10A, 10B when using high calorific fuel, the combustion air can be preheated prior to entering the burners 10A, 10B.

The inventive method allows for the operation of the regenerative burner system in two different modes. In the first mode, in which low calorific fuel is used, the low calorific fuel is regeneratively preheated. In the second mode in which high calorific fuel is used, combustion air is regeneratively preheated. In this manner, the inventive method efficiently utilizes a single-bed regenerative burner system with both low calorific fuel and high calorific fuel. In the first mode, the combustion efficiency is maximized by regeneratively preheating the low calorific fuel, which has a larger mass flow than the required combustion air. In the second mode, the combustion efficiency is maximized by utilizing the regenerators to preheat the combustion air.

In the first mode, low calorific fuel preheated in the regenerative media bed and combustion air are provided directly to the burner. In the second mode, combustion air preheated in the regenerative media bed and high calorific fuel are provided to the burner. This method has several advantages. Based on availability, the lowest cost fuel can be efficiently used in the same burner system. Both high calorific fuels, which cannot be heated in a regenerative media bed, and low calorific fuels, which require preheating for higher efficiency, can be used in the same regenerative combustion burner system. High fuel efficiency can be achieved regardless of the fuel that is used by using the regenerative media bed for preheating at least one of the supply gases in each mode. Only a single regenerative media bed is needed for each burner, whereas prior art double regeneration systems utilized two regenerative media beds for each burner, one for fuel and one for combustion air. This allows the burner system to be installed in smaller spaces. All of these advantages result in increased versatility and substantial cost savings over prior art double regeneration systems.

Figure 1:
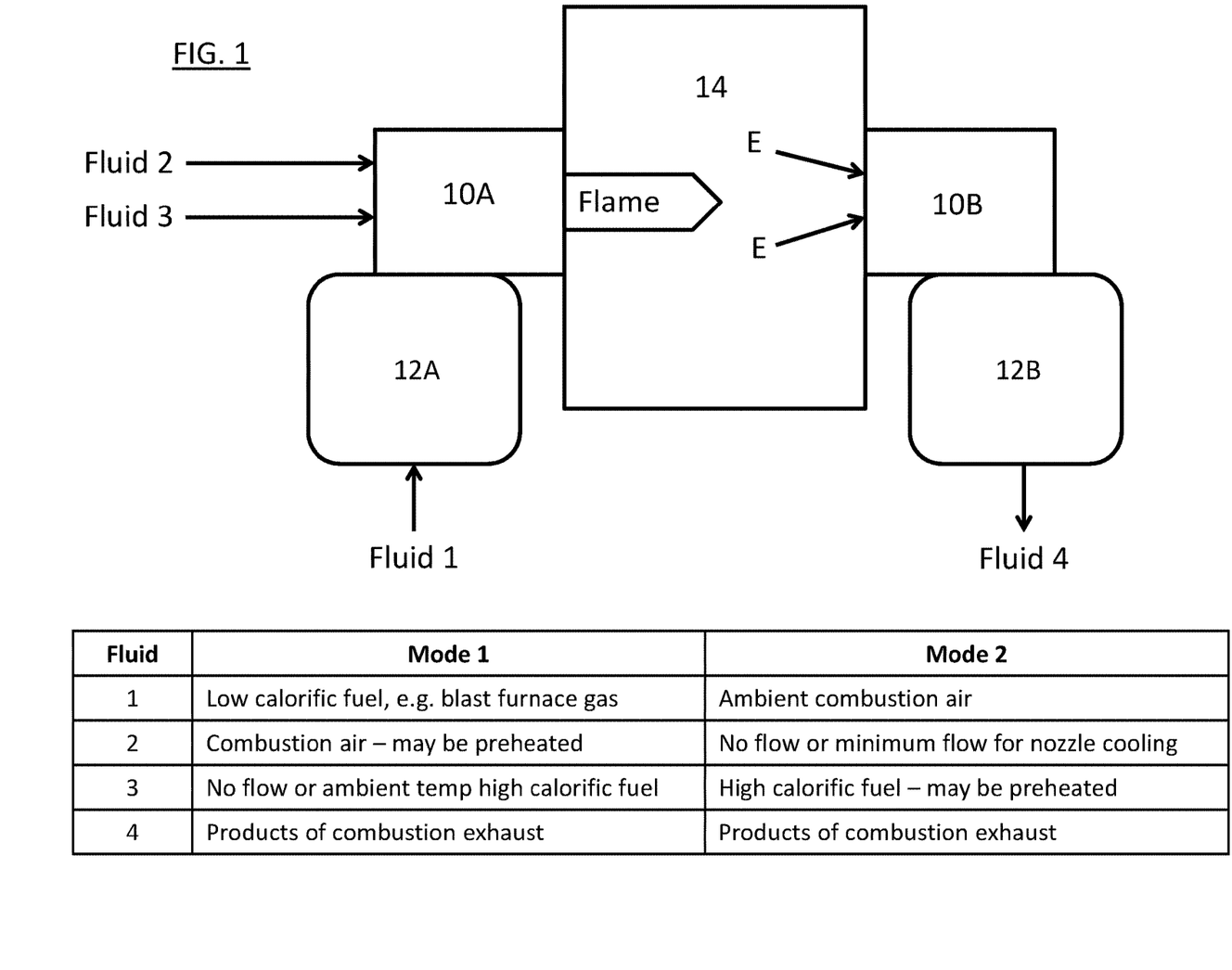
FIG. 1 is a schematic showing the apparatus and method according to the invention when the first burner is in firing mode and the second burner is in regeneration mode.
Figure 2:
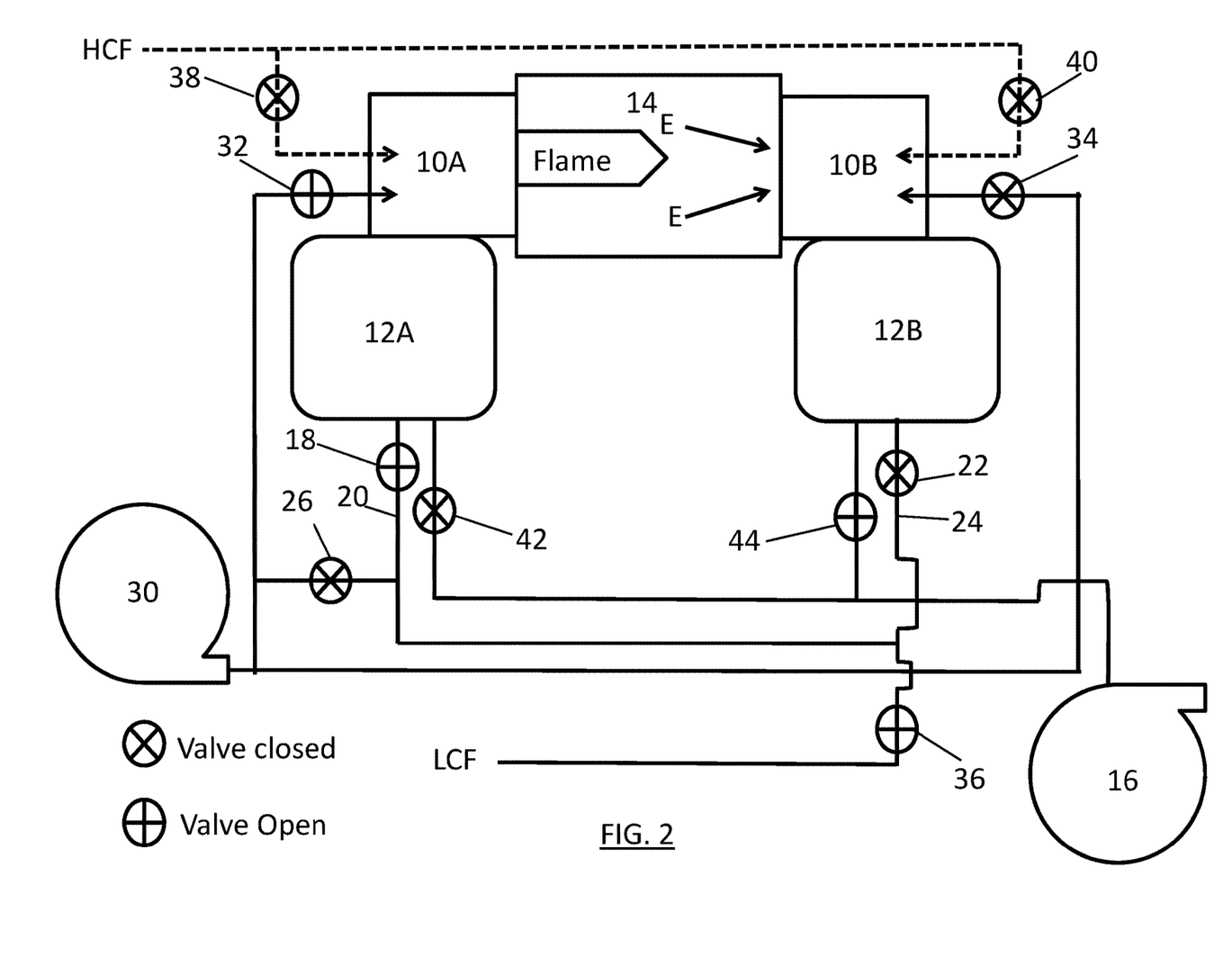
FIG. 2 is a schematic showing the apparatus and method according to the invention when the first burner is in a first firing mode using low calorific fuel and the second burner is in regeneration mode.
Figure 3:
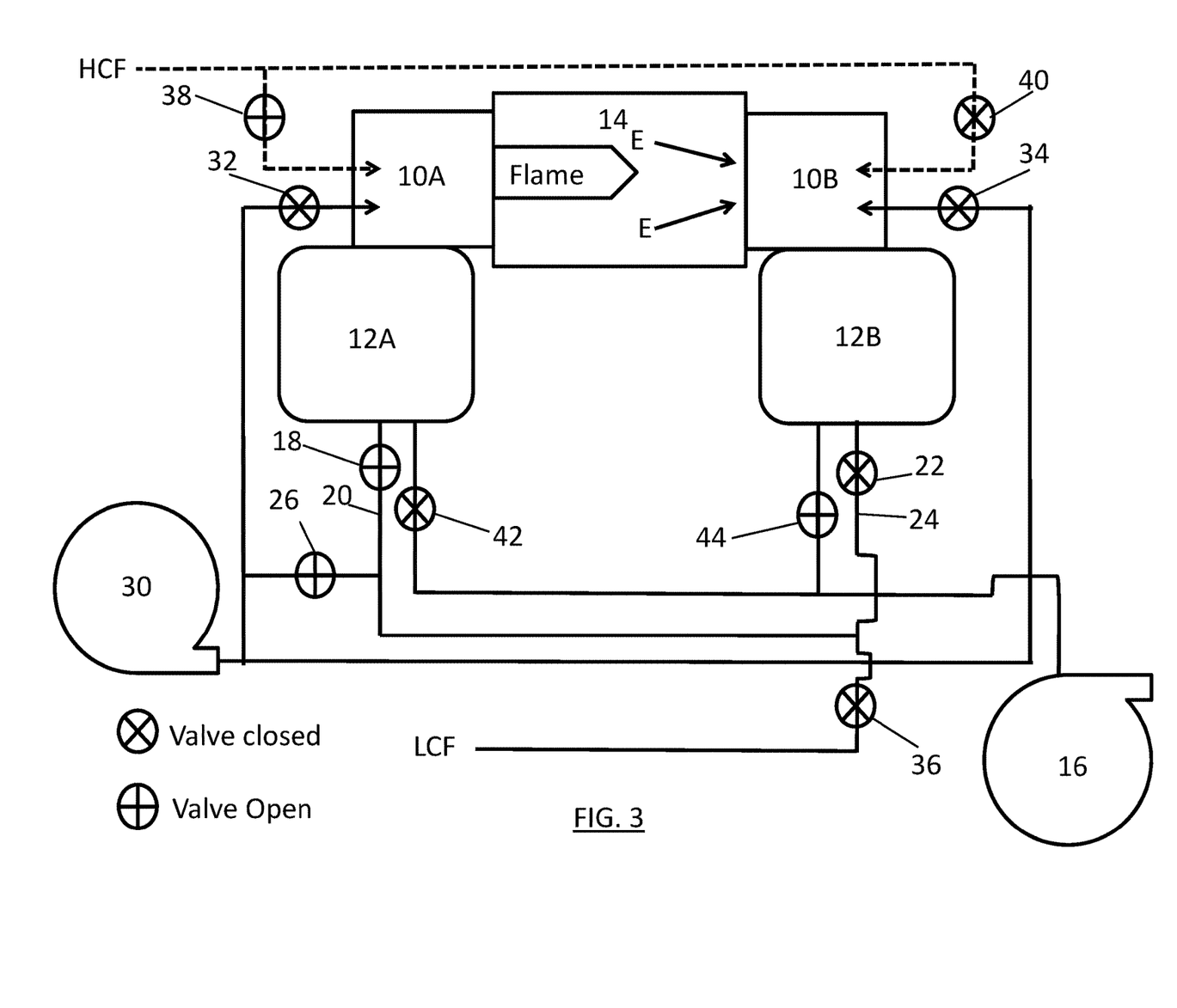
FIG. 3 is a schematic showing the apparatus and method according to the invention when the first burner is in a second firing mode using high calorific fuel and the second burner is in regeneration mode.

FIGS. 1-3 show the inventive method and system when the first burner 10A is in the firing cycle and the second burner 10B is in the regeneration cycle. As shown generally in FIG. 1 and more specifically in FIG. 2, in the first mode, a low calorific fuel, for example, blast furnace gas, flows through the first regenerative media bed 12A and into the first burner 10A and combustion air is supplied directly to the first burner 10A. The products of combustion exhaust (arrow E) flow through the furnace 14, through the second burner 10B, through the second regenerative media bed 12B, and are exhausted with an exhaust fan 16 or other suitable device.

As can been seen in FIG. 2, the control valve 18 between the first regenerative media bed 12A and the first supply line 20 supplying combustion air and/or fuel to the first regenerative media bed 12A is open and the control valve 22 between the second regenerative media bed 12B and the second supply line 24 supplying combustion air and/or fuel to the second regenerative media bed 12B is closed.

The control valve 26 between the combustion air supply 30 and the first supply line 20 and the second supply line 24 is closed. The control valve 32 between the combustion air supply 30 and the first burner 10A is open, and the control valve 34 between the combustion air supply 30 and the second burner 10B is closed. As a result, combustion air is supplied directly to the first burner 10A. The combustion air may be preheated in a recuperator or another preheating device prior to entering the first burner 10A. The combustion air may be supplied at a pressure of 0.2-1.0 psig, for example, 0.5 psig, and at a temperature of 700-1000° F. No combustion air is supplied to the second burner 10B.

The control valve 36 between the low calorific fuel supply LCF and the first supply line 20 and the second supply line 24 is open. As a result of the positioning of the control valves 18, 22, 36 between the low calorific fuel supply LCF, the first regenerative media bed 12A, and the second regenerative media bed 12B, low calorific fuel flows through the first regenerative media bed 12A where the fuel is preheated and then into the first burner 10A. The low calorific fuel may be supplied at a pressure of 0.2-1.0 psig, for example, 0.5 psig, and at a temperature of 70-125° F., for example, 100° F. No low calorific fuel is supplied to the second regenerative media bed 12B or the second burner 10B.

Control valves 38, 40 between the high calorific fuel supply HCF and the first burner 10A and between the high calorific fuel supply HCF and the second burner 10B are closed. As a result, no high calorific fuel is supplied to either of the burners 10A, 10B.

The control valve 42 between the first regenerative media bed 12A and the exhaust fan 16 is closed, and the control valve 44 between the second regenerative media bed 12B and the exhaust fan 16 is open. Typically, 50-60% of the products of combustion exhaust is exhausted through the exhaust fan 16.

In an alternative embodiment, the control valve 38 between the high calorific fuel supply HCF and the first burner 10A may be opened to supply supplemental fuel to the first burner 10A.

As shown generally in FIG. 1 and more specifically in FIG. 3, in the second mode, combustion air flows through the first regenerative media bed 12A and into the first burner 10A and high calorific fuel is supplied directly to the first burner 10A. The high calorific fuel may be preheated prior to entering the first burner 10A. The products of combustion exhaust (arrow E) flow through the furnace 14, through the second burner 10B, through the second regenerative media bed 12B, and are exhausted with an exhaust fan 16 or other suitable device.

As can been seen in FIG. 3, the control valve 18 between the first regenerative media bed 12A and the first supply line 20 supplying combustion air and/or fuel to the first regenerative media bed 12A is open and the control valve 22 between the second regenerative media bed 12B and the second supply line 24 supplying combustion air and/or fuel to the second regenerative media bed 12B is closed.

The control valve 26 between the combustion air supply 30 and the first supply line 20 and the second supply line 24 is open. The control valves 32, 34 between the combustion air supply 30 and the first burner 10A and between the combustion air supply 30 and the second burner 10B are closed. As a result of the positioning of the control valves 18, 22, 26 between the combustion air supply 30, the first regenerative media bed 12A, and the second regenerative media bed 12B, combustion air is supplied to the first regenerative media bed 12A where the combustion air is preheated and then into the first burner 10A. No combustion air is supplied to the second regenerative media bed 12B or the second burner 10B.

The control valve 36 between the low calorific fuel supply LCF and the first supply line 20 and the second supply line 24 is closed. As a result, no low calorific fuel is supplied to either of the regenerative media beds 12A, 12B or the burners 10A, 10B.

The control valve 38 between the high calorific fuel supply HCF and the first burner 10A is open, and the control valve 40 between the high calorific fuel supply HCF and the second burner 10B is closed. As a result, high calorific fuel is supplied to the first burner 10A. No high calorific fuel is supplied to the second burner 10B.

In an alternative embodiment, the control valve 32 between the combustion air supply 30 and the first burner 10A may be opened to supply air for nozzle cooling.

Figure 4:
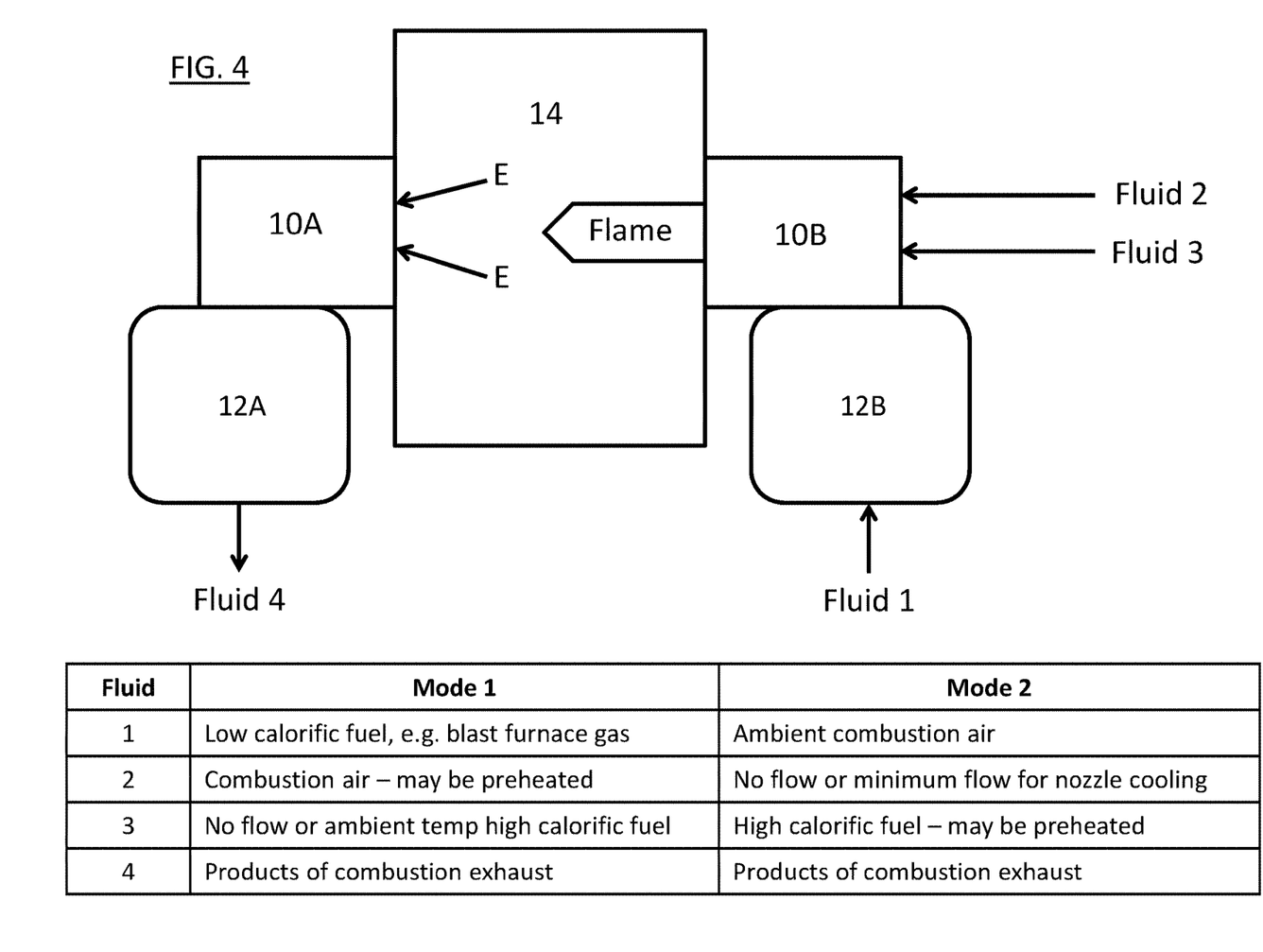
FIG. 4 is a schematic showing the apparatus and method according to the invention when the first burner is in regeneration mode and the second burner is in firing mode.
Figure 5:
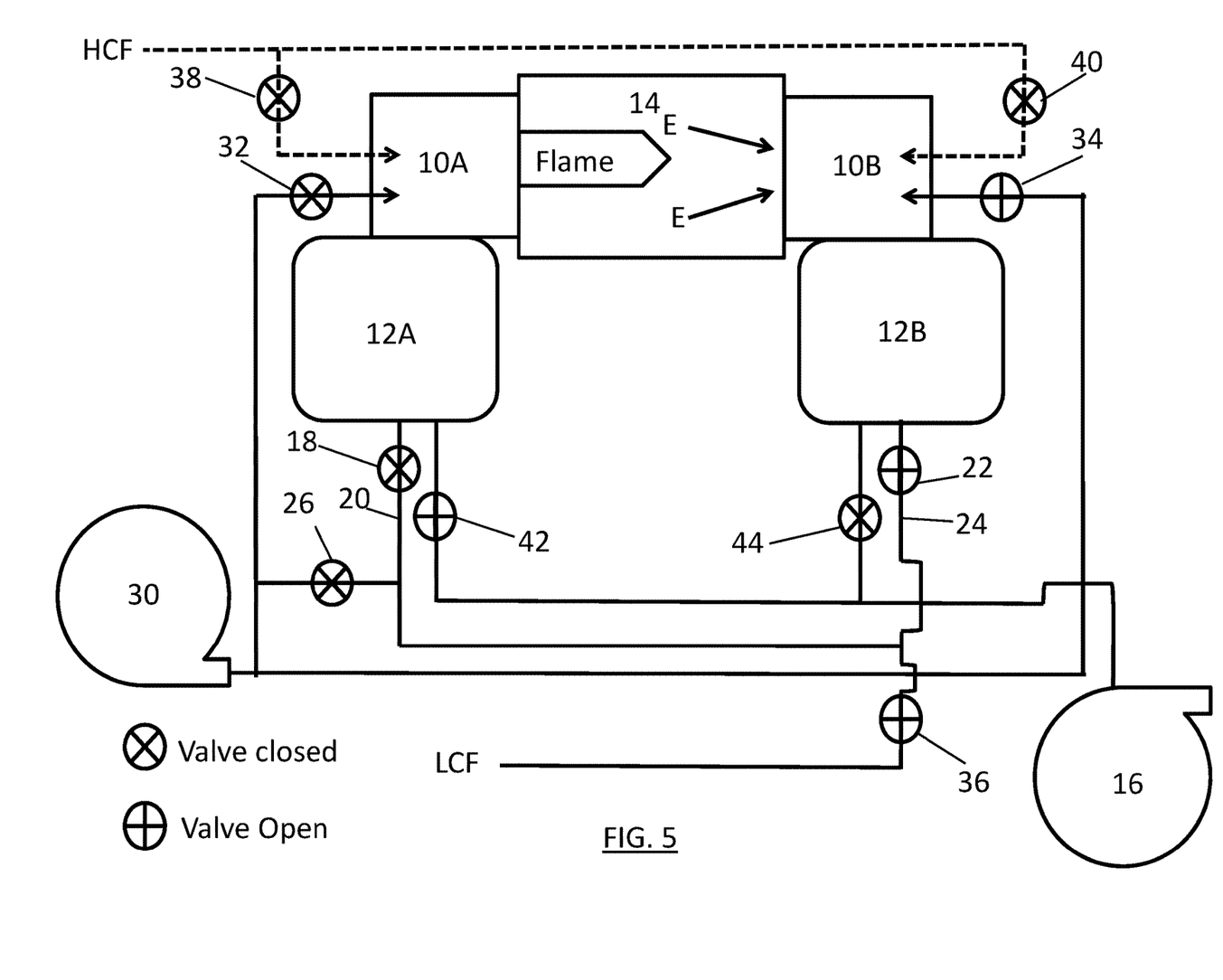
FIG. 5 is a schematic showing the apparatus and method according to the invention when the second burner is in a first firing mode using low calorific fuel and the first burner is in regeneration mode.
Figure 6:
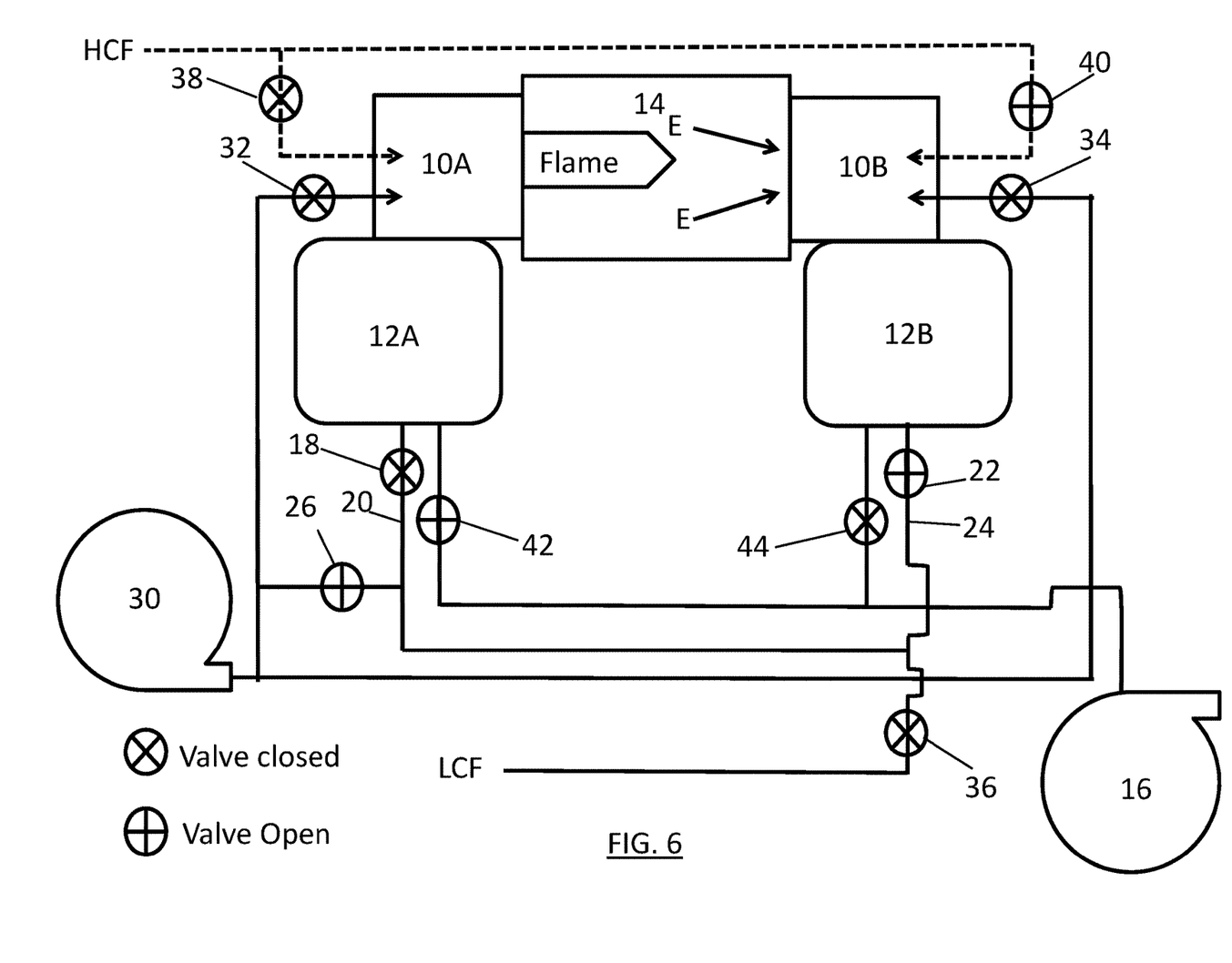
FIG. 6 is a schematic showing the apparatus and method according to the invention when the second burner is in a second firing mode using high calorific fuel and the first burner is in regeneration mode.

FIGS. 4-6 show the inventive method and system when the second burner 10B is in the firing cycle and the first burner 10A is in the regeneration cycle. As shown generally in FIG. 4 and more specifically in FIG. 5, in the first mode, a low calorific fuel, for example, blast furnace gas, flows through the second regenerative media bed 12B and into the second burner 10B and combustion air is supplied directly to the second burner 10B. The combustion air may be preheated in a recuperator or another preheating device prior to entering the second burner 10B. The products of combustion exhaust (arrow E) flow through the furnace 14, through the first burner 10A, through the first regenerative media bed 12A, and are exhausted with an exhaust fan 16 or other suitable device.

As can been seen in FIG. 5, the control valve 18 between the first regenerative media bed 12A and the first supply line 20 supplying combustion air and/or fuel to the first regenerative media bed 12A is closed and the control valve 22 between the second regenerative media bed 12B and the second supply line 24 supplying combustion air and/or fuel to the second regenerative media bed 12B is open.

The control valve 26 between the combustion air supply 30 and the first supply line 20 and the second supply line 24 is closed. The control valve 32 between the combustion air supply 30 and the first burner 10A is closed, and the control valve 34 between the combustion air supply 30 and the second burner 10B is open. As a result, combustion air is supplied directly to the second burner 10B. The combustion air may be supplied at a pressure of 0.2-1.0 psig, for example, 0.5 psig, and at a temperature of 700-1000° F. No combustion air is supplied to the first burner 10A.

The control valve 36 between the low calorific fuel supply LCF and the first supply line 20 and the second supply line 24 is open. As a result of the positioning of the control valves 18, 22, 36 between the low calorific fuel supply LCF, the first regenerative media bed 12A, and the second regenerative media bed 12B, low calorific fuel flows through the second regenerative media bed 12B where the fuel is preheated and then into the second burner 10B. The low calorific fuel may be supplied at a pressure of 0.2-1.0 psig, for example, 0.5 psig, and at a temperature of 75-125° F., for example, 100° F. No low calorific fuel is supplied to the first regenerative media bed 12A or the first burner 10A.

Control valves 38, 40 between the high calorific fuel supply HCF and the first burner 10A and between the high calorific fuel supply HCF and the second burner 10B are closed. As a result, no high calorific fuel is supplied to either of the burners 10A, 10B.

The control valve 42 between the first regenerative media bed 12A and the exhaust fan 16 is open, and the control valve 44 between the second regenerative media bed 12B and the exhaust fan 16 is closed.

In an alternative embodiment, the control valve 40 between the high calorific fuel supply HCF and the second burner 10B may be opened to supply supplemental fuel to the second burner 10B.

As shown generally in FIG. 4 and more specifically in FIG. 6, in the second mode, combustion air flows through the second regenerative media bed 12B and into the second burner 10B and high calorific fuel is supplied directly to the second burner 10B. The high calorific fuel may be preheated prior to entering the second burner 10B. The products of combustion exhaust (arrow E) flow through the furnace 14, through the first burner 10A, through the first regenerative media bed 12A, and are exhausted with an exhaust fan 16 or other suitable device.

As can been seen in FIG. 6, the control valve 18 between the first regenerative media bed 12A and the first supply line 20 supplying combustion air and/or fuel to the first regenerative media bed 12A is closed and the control valve 22 between the second regenerative media bed 12B and the second supply line 24 supplying combustion air and/or fuel to the second regenerative media bed 12B is open.

The control valve 26 between the combustion air supply 30 and the first supply line 20 and the second supply line 24 is open. The control valves 32, 34 between the combustion air supply 30 and the first burner 10A and between the combustion air supply 30 and the second burner 10B are closed. As a result of the positioning of the control valves 18, 22, 26 between the combustion air supply 30, the first regenerative media bed 12A, and the second regenerative media bed 12B, combustion air is supplied to the second regenerative media bed 12B where the combustion air is preheated and then into the second burner 10B. No combustion air is supplied to the first regenerative media bed 12A or the first burner 10A.

The control valve 36 between the low calorific fuel supply LCF and the first supply line 20 and the second supply line 24 is closed. As a result, no low calorific fuel is supplied to either of the regenerative media beds 12A, 12B or the burners 10A, 10B.

The control valve 38 between the high calorific fuel supply HCF and the first burner 10A is closed, and the control valve 40 between the high calorific fuel supply HCF and the second burner 10B is open. As a result, high calorific fuel is supplied to the second burner 10B. No high calorific fuel is supplied to the first burner 10A.

In an alternative embodiment, the control valve 34 between the combustion air supply 30 and the second burner 10B may be opened to supply air for nozzle cooling.

While the inventive method has been discussed herein as using combustion air, any suitable oxidizing gas may be used, for example, oxygen. In addition, the specific valving shown in the figures and described herein may be adapted in any way as long as the described flow paths for the fuels and the combustion air are maintained.

The invention claimed is:

1. A regenerative burner system for a furnace comprising:
a first burner assembly comprising a burner, a regenerative media bed, an oxidizing gas supply line directly connected to the burner from an oxidizing gas supply for introducing oxidizing gas into the burner, a second oxidizing gas supply line connected to the regenerative media bed for introducing oxidizing gas into the regenerative media bed, a low calorific fuel supply line connected to the regenerative media bed for introducing low calorific fuel into the regenerative media bed, a high calorific fuel supply line directly connected to the burner from a high calorific fuel supply for introducing high calorific fuel into the burner, an inlet in the regenerative media bed through which exhaust gases from the furnace enter the regenerative media bed, and an outlet in the regenerative media bed through which exhaust gases that have passed through the regenerative media bed exit the regenerative media bed; and a second burner assembly comprising a burner and a regenerative media bed, an oxidizing gas supply line directly connected to the burner from the oxidizing gas supply for introducing oxidizing gas into the burner, a second oxidizing gas supply line connected to the regenerative media bed for introducing oxidizing gas into the regenerative media bed, a low calorific fuel line connected to the regenerative media bed for introducing low calorific fuel into the regenerative media bed, a high calorific fuel supply line directly connected to the burner from a high calorific fuel supply for introducing high calorific fuel into the burner, an inlet in the regenerative media bed through which exhaust gases from the furnace enter the regenerative media bed, and an outlet in the regenerative media bed through which exhaust gases that have passed through the regenerative media bed exit the regenerative media bed, wherein, during operation, the regenerative bed of each burner assembly is supplied with oxidizing gas or low calorific fuel, and the burner of each burner assembly is supplied with oxidizing gas and/or a high calorific fuel.

2. The regenerative burner system of claim 1, wherein the first burner assembly further comprises valves that open and close the oxidizing gas supply line connected to the burner of the first burner assembly, the second oxidizing gas supply line connected to the regenerative media bed of the first burner assembly, the low calorific fuel supply line connected to the regenerative media bed of the first burner assembly, the high calorific fuel supply line connected to the burner of the first burner assembly, and the inlet in the regenerative media bed of the first burner assembly; and wherein the second burner assembly further comprises valves that open and close the oxidizing gas supply line connected to the burner of the second burner assembly, the second oxidizing gas supply line connected to the regenerative media bed of the second burner assembly, the low calorific fuel supply line connected to the regenerative media bed of the second burner assembly, the high calorific fuel supply line connected to the burner of the second burner assembly, and the inlet in the regenerative media bed of the second burner assembly.

3. The regenerative burner system of claim 1, wherein the high calorific fuel is a gaseous fuel having a heating value of 150 to 3000 BTU/scf or an oil having a heating value of 10,000 to 20,000 BTU/pound.

4. The regenerative burner system of claim 1, wherein the low calorific fuel has a heating value of 75-100 BTU/scf.

5. The regenerative burner system of claim 2, wherein each of the burner assemblies comprises a firing mode where the valves of the burner assembly are set such that fuel and oxidizing gas flow into the burner assembly and a regeneration mode where the valves of the burner assembly are set such that combustion gases from the furnace flow into the burner assembly and through the regeneration bed.

6. The regenerative burner system of claim 5, wherein, when the valves of the first burner assembly are set for the firing mode, the valves of the second burner assembly are set for the regeneration mode, and when the valves of the first burner assembly are set for the regeneration mode, the valves of the second burner assembly are set for the firing mode.

7. The regenerative burner system of claim 6, wherein the setting of the valves of the burner assembly in the firing mode are changeable from a first operating mode in which low calorific fuel is supplied via the low calorific fuel supply line connected to the regenerative media bed of the burner assembly that is operating in the firing mode and oxidizing gas is supplied via the oxidizing gas supply line connected to the burner of the burner assembly that is operating in the firing mode to a second operating mode in which oxidizing gas is supplied via the second oxidizing gas supply line connected to the regenerative media bed of the burner assembly that is operating in the firing mode and high calorific fuel is supplied via the high calorific fuel supply line connected to the burner of the burner assembly that is operating in the firing mode.

8. The regenerative burner system of claim 7, further comprising a preheater for the oxidizing gas supply lines of the first burner assembly and/or the second burner assembly.

9. The regenerative burner system of claim 7, wherein in the first operating mode, the valves of the burner assembly operating in firing mode are set such that supplemental high calorific fuel is supplied via the high calorific fuel supply line connected to the burner.

10. The regenerative burner system of claim 7, further comprises a preheater for the high calorific fuel supply lines of the first burner assembly and/or the second burner assembly.

11. The regenerative burner system of claim 7, wherein in the second operating mode, the valves of the burner assembly operating in firing mode are set such that supplemental oxidizing gas that has not passed through the regenerative media bed is supplied to the burner via the oxidizing gas supply line connected to the burner operating in firing mode for nozzle cooling.

\* \* \* \* \*